US012808355B2

(12) United States Patent
Oakes et al.

(10) Patent No.: US 12,808,355 B2
(45) Date of Patent: Nov. 24, 2026

(54) ENERGY HARVESTING ROAD

(71) Applicant: Oakes LTD, Yorkshire (GB)

(72) Inventors: Simon Oakes, Yorkshire (GB); Frank Oakes, Yorkshire (GB)

( * ) Notice: Subject to any disclaimer, the term of this patent is extended or adjusted under 35 U.S.C. 154(b) by 0 days.

(21) Appl. No.: 19/103,574

(22) PCT Filed: Aug. 1, 2023

(86) PCT No.: PCT/EP2023/071303
§ 371 (c)(1),
(2) Date: Feb. 13, 2025

(87) PCT Pub. No.: WO2024/037871
PCT Pub. Date: Feb. 22, 2024

(65) Prior Publication Data
US 2026/0049601 A1 Feb. 19, 2026

(30) Foreign Application Priority Data
Aug. 15, 2022 (GB) ..................................... 2211879

(51) Int. Cl.
*F03G 7/08* (2006.01)
*E01C 11/00* (2006.01)
*H02N 11/00* (2006.01)

(52) U.S. Cl.
CPC .............. *F03G 7/083* (2021.08); *E01C 11/00* (2013.01); *F03G 7/085* (2021.08); *H02N 11/002* (2013.01)

(58) Field of Classification Search
CPC .......... F03G 7/083; F03G 7/085; E01C 11/00; H02N 11/002
See application file for complete search history.

(56) References Cited

U.S. PATENT DOCUMENTS 4,980,572 A 12/1990 Sen
6,353,270 B1 * 3/2002 Sen ......................... F03G 7/083 290/1 R (Continued)

FOREIGN PATENT DOCUMENTS

GB 2431967 A 5/2007
JP 2002-349420 A 12/2002

(Continued)

OTHER PUBLICATIONS

Search Report Issued in GB 2211879.8 dated Jan. 24, 2023.

(Continued)

*Primary Examiner* — Joseph Ortega
(74) *Attorney, Agent, or Firm* — McCarter & English, LLP; Michael A. Sartori

(57) ABSTRACT

An energy harvesting apparatus comprising: a movable road component (106) that is configured to move away from a raised position due to a weight of one or more vehicles on the movable road component; a link (108) that is coupled to the movable road component, the link being movable between a rigid configuration and a flexible configuration, wherein in the rigid configuration, the link is configured to transfer force from the movable road component to act as a work input; and wherein in the flexible configuration, the link is configured to substantially isolate the movement of the movable road component to prevent the link from acting as a work input.

19 Claims, 7 Drawing Sheets

(56) References Cited

U.S. PATENT DOCUMENTS

| | | | | |
|---|---|---|---|---|
| 2022/0166289 | A1* | 5/2022 | McIntosh | H02K 7/02 |
| 2024/0218857 | A1* | 7/2024 | Goren | F01D 15/10 |

FOREIGN PATENT DOCUMENTS

| | | | |
|---|---|---|---|
| JP | 2014-137045 | A | 7/2014 |
| JP | 2014-190282 | A | 10/2014 |
| WO | WO-99/51879 | A1 | 10/1999 |
| WO | WO-2010/088307 | A1 | 8/2010 |
| WO | WO-2020/053828 | A1 | 3/2020 |

OTHER PUBLICATIONS

Office Action issued in Australian Application No. 2023325377 dated May 6, 2026.

Office Action issued in JP Application No. 2025-508878 dated Apr. 24, 2026.

* cited by examiner

ENERGY HARVESTING ROAD

CROSS REFERENCE TO RELATED APPLICATIONS

This application is a U.S. National Stage Application filed under 35 U.S.C. § 371, based on International Patent Application No. PCT/EP2023/071303, filed on Aug. 1, 2023, which claims priority to GB Patent Application No. 2211879.8, filed Aug. 15, 2022. The entire contents of each of the above applications are incorporated herein by reference.

The present disclosure relates to an energy harvesting apparatus and a method of operating an energy harvesting apparatus.

BACKGROUND

Vehicles have been driving on roads since the early 20$^{th}$ century. Since then, the majority of the developed world has developed significant road infrastructure. According to the RAC, there were 39.2 million licensed vehicles in Great Britain at the end of June 2021.

The UK government committing to reduce its greenhouse gas emissions to net zero by 2050. Further, the UK has set a target for all of the UK's electricity to come from clean sources by 2035. As such, there has been a significant drive to obtain energy from alternative sources to traditional fossil fuels.

The number of vehicles on the road in the UK contributes to the greenhouse gas emissions in the UK. However, it is an object of the present invention to attempt to mitigate some of the emissions released by vehicles driving on the road.

SUMMARY

According to the present disclosure there is provided an energy harvesting apparatus as set forth in the appended claims. Other features of the invention will be apparent from the dependent claims, and the description which follows.

According to a first aspect, there is provided an energy harvesting apparatus comprising: a movable road component that is configured to move away from a raised position due to a weight of said one or more vehicles on the movable road component; a link that is coupled to the movable road component, the link being movable between a rigid configuration and a flexible configuration, wherein in the rigid configuration, the link is configured to be transfer force from the movable road component to act as a work input; and wherein in the flexible configuration, the link is configured to substantially isolate the movement of the movable road component to prevent the link from acting as a work input.

The energy harvesting apparatus is configured to harvest energy from vehicles driving over the road for storage or use elsewhere. Further, as the link is movable between a flexible configuration and a rigid configuration, the apparatus can either operate in a harvesting mode in which energy is harvested or a non-harvesting mode, which means that the energy harvesting apparatus can operate efficiently. In other words, during quiet times on the road in which there are no vehicles travelling, the apparatus can be in a non-harvesting mode, but then be changed to a harvesting mode when required.

In the rigid configuration, the link may be configured to move in a first direction such that it is in a fixed relationship relative to the movable road component.

The link may comprise a first member and a second member coupled together at a first fixation point, wherein in the rigid configuration, the first member and a second member are fixed relative to each other at the fixation point and wherein in the flexible configuration the first member and second member are movable relative to each other about the fixation point.

Adjusting the link between the flexible configuration and the rigid configuration enables the apparatus to switch between harvesting mode and non-harvesting mode as desired.

The link may comprise an actuator coupled to the fixation point to selectively change the link between the rigid configuration and the flexible configuration. The actuator may be controlled to change the apparatus between modes as required.

In one example, the apparatus includes a speed sensor configured to measure the speed of said vehicle; and a controller configured to control the actuator to selectively change the link from the flexible configuration to the rigid configuration in advance of the vehicle passing over the movable road component. The link may be moved to the rigid configuration at a time in which the vehicle is due to travel over the movable road component and then moved back to the flexible configuration when there are no vehicles present.

In one example, the movable road component comprises a head section configured to protrude above a substantially level surface of road and a leg section that is configured to extend through the surface of road to couple with the link. The head section may take the form of a standard element that protrudes above the road surface (for example a cat's eye or a speed bump.

In one example, the leg section is configured to be constrained to move in a first direction by one or more leg guides.

In one example, the movable road component comprises a first road section and a second road section forming a surface of road one which a vehicle is drivable, wherein the first road section is movable with respect to the second road section. For example, the road itself may be the movable road component that is configured to move as the vehicle passes over it.

In one example, the movable road component comprises a pivot, wherein a trailing region of the first road section is coupled with a leading region of the second road section at the pivot, such that the first road section and the second road section are partially rotatable relative to each other about the pivot; one or more guiderails configured to receive said pivot and constrain movement of the pivot to a first direction as a vehicle is passing over the road surface; wherein the pivot is configured to move away from the raised position when said weight of said vehicle is supported on one or more of the first road section and the second road section. In one example, the movement of the pivot is dependent upon said weight of said vehicle and the bias provided by the biasing element. The pivot and biasing element provide a mechanism in which the movable road component may move as required.

In one example, the trailing edge of the first road section comprises a plurality of slots and teeth configured to mesh with a correspondingly shaped plurality of slots and teeth of the leading edge of the second road section.

In one example, the movable road component comprises a first sliding plate comprising an aperture through which the pivot is configured to extend; wherein the first sliding plate is configured to be received in the one or more guiderails to constrain the movement of the first sliding plate and pivot to the first direction along the one or more guiderails. The sliding plate may be used to restrict movement of the movable road component to a first direction (e.g., a vertical direction).

In one example, the movable road component comprises a biasing element configured to bias the movable road component to the raised position. The biasing element may be used such that the movable road component is moved to a raised position when a vehicle is due to drive over it and a lowered position when the vehicle is not due to drive over it. That is to say that a controller may be used to adjust the position of the biasing element or the biasing force upon detection of a weight/speed of a vehicle by one or more sensors.

In one example, the biasing element comprises a counterweight.

The apparatus may comprise a weight sensor configured to sense the weight of said vehicle passing on the deformable road, wherein an amount of biasing provided by the biasing element is dependent on the weight of said vehicle. Data form the weight sensor may be used to adjust the position of the movable road component.

In one example, the apparatus includes an energy driving mechanism and the link is configured to be coupled to the energy driving mechanism and provide the work input to the energy driving mechanism.

In one example, the energy driving mechanism comprises one or more of: a rack and pinion; a piston gear; one or more direct drive gears and/or any mechanical drive, for example a piston drive.

In one example, the energy driving mechanism comprises one or more of: a single acting pump; a double acting pump; a peristaltic pump; bellows pump; a peristaltic pipe for transporting fluid and/or an air/gas compressor and/or pump.

In one example, the energy driving mechanism is configured to transport fluid from a first position to a second position having a higher head.

In one example, the fluid comprises one or more of air, compressed air, water soluble oil, hydraulic oil, or other suitable fluids.

In one example, the energy driving mechanism is configured to generate electric energy.

In one example, the apparatus comprises a structure configured to extend over the road, the structure configured to hold fluid within it and the energy driving mechanism is configured to move the fluid within the structure, in use.

The features disclosed above may be combined in various ways.

BRIEF DESCRIPTION OF THE DRAWINGS

Examples of the present disclosure will now be described with reference to the accompanying drawings.

DETAILED DESCRIPTION

The present disclosure relates to an energy harvesting apparatus. The energy harvesting apparatus includes a movable or deformable road component that is configured to move or deform as vehicles drive over it. The movement of the road component may act as an energy and/or work input for a generator/motor or the like. In other words, a portion of the energy from the vehicles passing over the road may effectively be harvested and stored/used as an energy input for an additional device.

Figure 1:
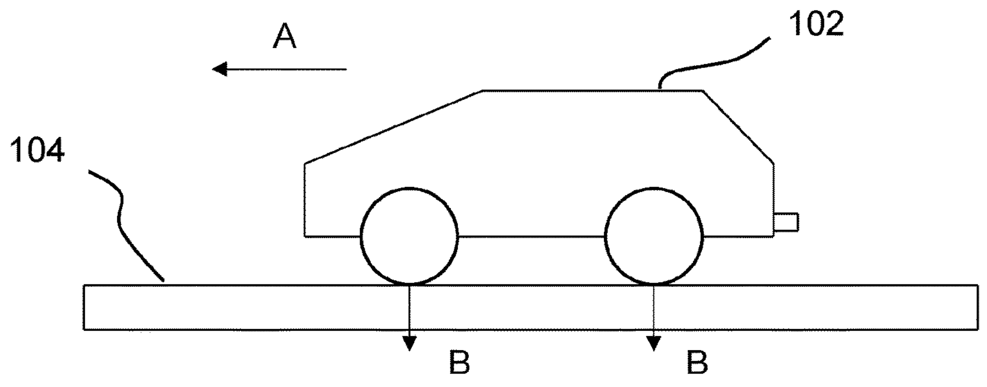
FIG. 1 shows an example of a side view of a vehicle on a traditional road.

FIG. 1 shows an example of a vehicle 102 in the form of a car driving over a road 104. The arrow A indicates the direction of travel of the vehicle. Two arrows B are shown representing the weight of the vehicle 102 passing through the wheels of the vehicle 102 to the road surface. Typically, in traditional roads, the road surface bears directly onto the ground or other support and is distributed such the road surface will have very minimal movement as the vehicle 102 passes over.

Figure 2:
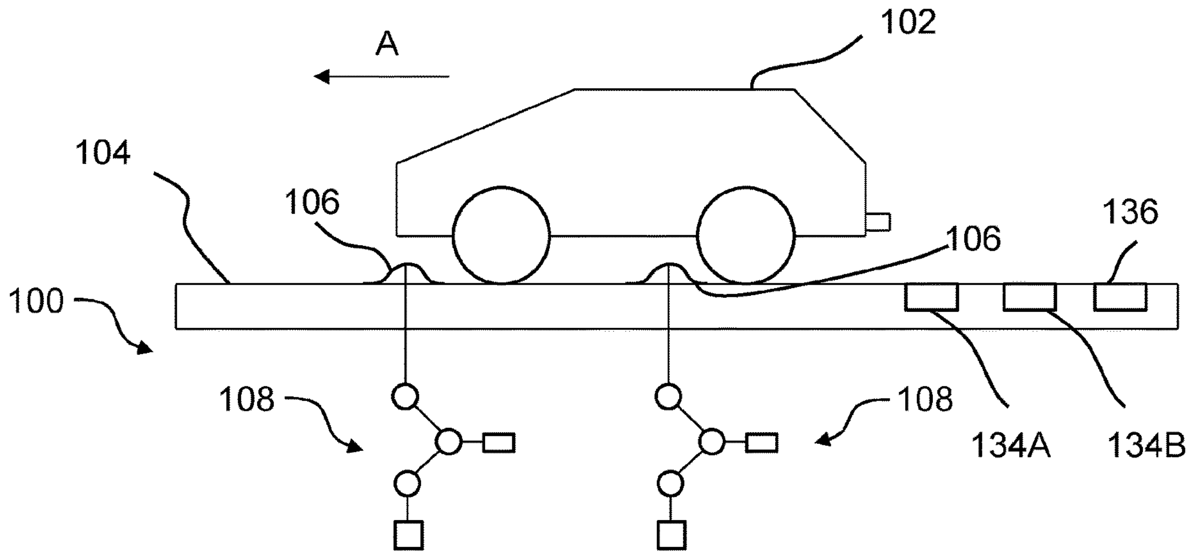
FIG. 2 shows an example of a side view of a vehicle on a road including a schematic of an energy harvesting apparatus.

FIG. 2 shows an example of an energy harvesting apparatus 100 according to the present invention. The energy harvesting apparatus 100 includes a movable road component 106 that is configured to move due to a weight of a vehicle 102 supported thereon. The movable road component 106 may take the form of any component that is movable in/on the road. In one example, the movable road component 106 takes the form of a deformable speed bump that is configured to compress and move as the weight of the vehicle 102 is supported thereon (e.g., when the vehicle drives over the movable road component). In a similar example, the movable road component may take the form of a protrusion that is raised from the normal (substantially level) surface of the road 104. A vehicle 102 driving on the road will come into contact with the movable road component 106 and impart a weight load onto it causing the movable road component 106 to move. In one example, the movable road component 106 may take the form of a cat's eye located on the normal driving path of a vehicle 102 on the road. In this example, the cat's eye is deformable under the weight of a vehicle.

In one example, the movable road component 106 is configured to move from a substantially level position to a depressed position due to the weight of a vehicle 102 supported thereon.

In other examples, the movable road component 106 comprises sections of the road itself and the road is configured to move as the vehicle 102 drives over it. This will be explained in more detail below.

As shown in FIG. 2, the energy harvesting apparatus 100 also includes a link 108. The link 108 is coupled to the movable road component 106 and is selectively configured to transfer the energy generated due to the movement of the movable road component 106 for it to be used as a work input. The link 108 is movable between a rigid configuration and a flexible configuration. In the rigid configuration, the link 108 is configured to be transfer energy from the movable road component 106 to act as a work input. In the flexible configuration, the link is configured to substantially isolate the movement of the movable road component 106 to prevent the link from acting as a work input.

Figure 3A:
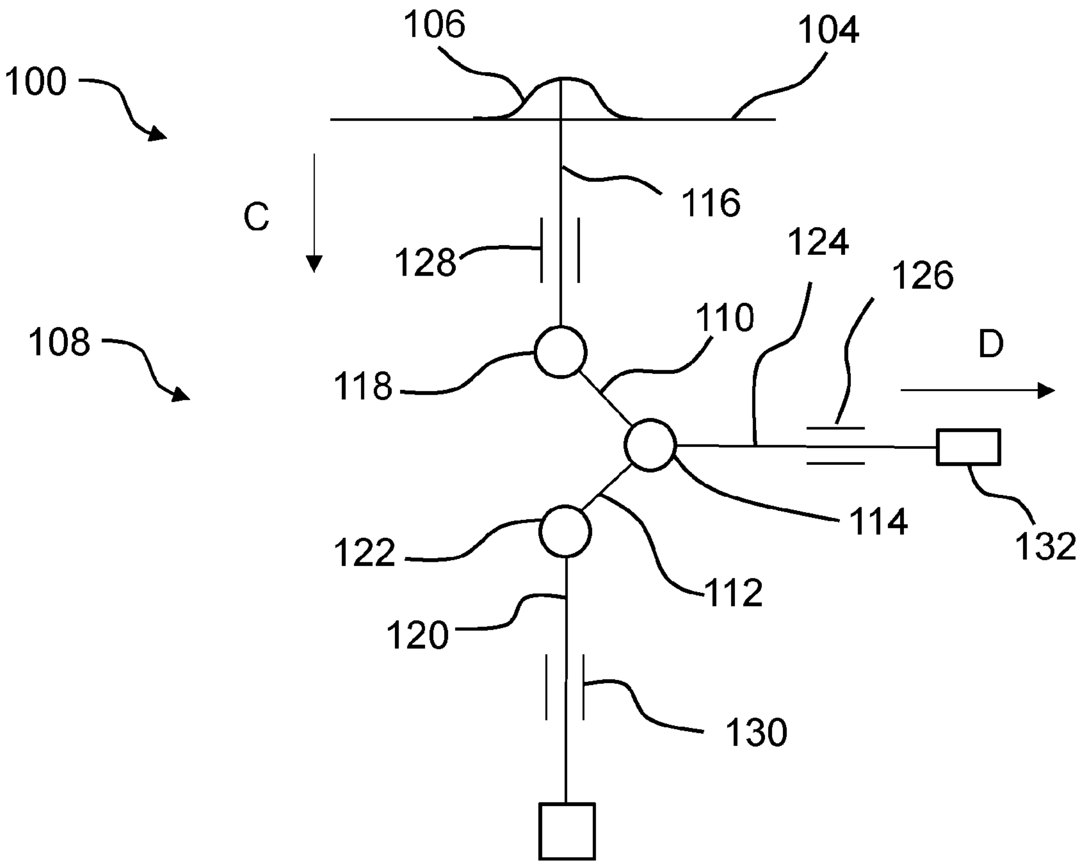
FIG. 3A shows schematic view of an energy harvesting apparatus in a flexible configuration.
Figure 3B:
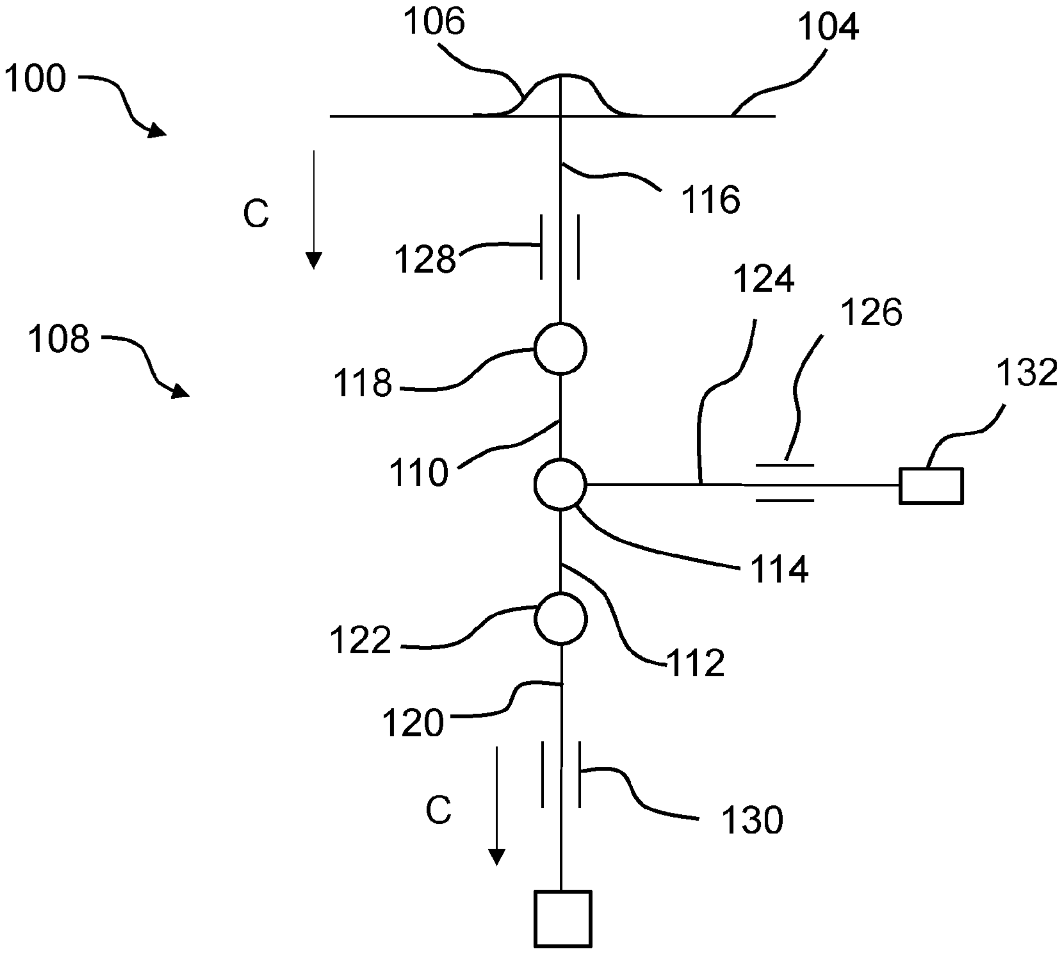
FIG. 3B shows schematic view of an energy harvesting apparatus in a rigid configuration.

The link 108 is shown in more detail in FIGS. 3A and 3B. In the examples shown in FIGS. 3A and 3B, the link 108 is shown as being formed of a first member 110 and a second member 112 that are coupled together about a first fixation point 114.

The position of the first member 110 and the second member 112 relative to each other determines if the link 108 is in the rigid configuration or the flexible configuration. In the flexible configuration, the first fixation point 114 is not fixed and the first member 110 and the second member 112 are rotatable with respect to each other about the fixation point. That is to say that the first member 110 is rotatable about the first fixation point 114 and the second member 112 is also rotatable about the fixation point 114. In the flexible configuration, the first member 110 and the second member 112 are not in a fixed relationship relative to each other. In the example shown in FIG. 3A, the link 108 is in the flexible configuration.

In some examples, the movable road component 106 includes a leg 116 that is configured to couple the movable road component 106 to the link 108. In other examples, the leg 116 is not a part of the movable road component 106 but rather part of the link 108 itself. The function of the leg 116 is to couple the movable road component 106 to the link 108 so the movable road component 106 is either directly or indirectly coupled to the link 108.

In one example, the leg 116 is configured to be coupled to a first end of the first member 110 at a second fixation point 116. As with the first fixation point 114, the second fixation point 116 is changeable between a locked configuration in which the leg 116 and the first member 110 are fixed relative to each other and an unlocked configuration in which the leg 116 and the first member 110 are rotatable relative to each other about the second fixation point 118.

In one example, the link 108 comprises a third member 120 that is configured to be coupled with the second member 112 at a third fixation point 122. As with the first fixation point 114 and the second fixation point 116, the third fixation point 122 is changeable between a locked configuration in which the third member 120 and the second member 112 are fixed relative to each other and an unlocked configuration in which the third member 120 and the second member 110 are rotatable relative to each other about the third fixation point 122. In some examples, the third member 120 and third fixation point are not part of the link 108, but rather part of an external apparatus that may be coupled with the link 108.

In one example, the link comprises a guide member 124. The guide member 124 is configured to be coupled with the first fixation point 114. The guide member 124 is not configured to rotate about the first fixation point 114. In one example, the guide member 124 is arranged to extend in a direction that is substantially perpendicular to the direction in which the let 116 and the third member 120 extends. The guide member 124 may be configured to be constrained to translate in a direction that is aligned with the longitudinal axis of the guide member 124. The link 108 may comprise a first restraint 126 that is configured to constrain movement of the guide member 124 and actuator 132 to the direction that is aligned with the longitudinal axis of the guide member 124. In one example, the guide member 124 comprises a pneumatic cylinder. The pneumatic cylinder may be telescopic. In one example, the actuator 132 may be trunnion mounted. In one example the actuator 132 comprises a trunnion mounted cylinder creating an inline link 108 that is not energised which allows the same movement energising any mechanism.

The link 108 may also include a second restraint (or leg restraint) 128 configured to constrain movement of the leg 116 to a direction that is aligned with the longitudinal axis of the leg 116.

The link 108 may also include a third restraint 130 configured to constrain movement of the third member 120 to a direction that is aligned with the longitudinal axis of the third member 120.

In the flexible configuration, the movable road component 106 is configured to move in a first direction C under the weight of the vehicle 102. The movement of the movable road component 106 causes a first end of the first member 110 to move in the same direction as the movement of the movable road component 106 (i.e. direction C shown in FIG. 3A). In some examples, as described above, the leg 116 transfers the movement of the movable road component 106 to the first member 110.

In the flexible configuration, the first fixation point 114 is in an unlocked configuration and the first member 110 and the second member 112 are rotatable about the first fixation point 114. In this case, as the first end of the first member 110 is moved in the first direction, the first member 110 and the second member 112 rotate relative to each other about the first fixation point 114 and cause the guide member 124 to move in direction D as shown in FIG. 3A.

In FIG. 3A, the link 108 is shown in a flexible configuration. That is to say that the third fixation point 122 is substantially isolated from the movement of the movable road component 106.

FIG. 3B shows an example of the energy harvesting apparatus 100 in a rigid configuration. In this example, the first fixation member 114 is fixed such that the first member 110 and the second member 112 are in a fixed relationship relative to each other (i.e., the first member 110 and the second member 112 are not rotatable about the first fixation member 114. In one example, in this configuration, the first member 110 and the second member 112 are aligned along a single longitudinal axis. Link 108 may have been moved from the flexible configuration to the rigid configuration by merely locking the first fixation member 114. In other examples, the link 108 may have been moved from the flexible configuration to the rigid configuration by locking the first fixation member 114, the second fixation member 118 and the third fixation member 122 after the first member 110 and the second member 112 have been aligned along a single longitudinal axis. The first member 110 and the second member 112 may be aligned by the action of an actuator 132 connected to the guide member 124. In other words, the actuator may selectively change the link 108 between the flexible configuration and the rigid configuration, as required. The first fixation member 114, second fixation member 118 and the third fixation member 122 may be any component, such as a hinge, that may couple the various combination of the first member 110, second member 112 and the third member 120 together and be movable between a flexible state to all the members to move relation to each other and a locked state to prevent the members moving relative to each other.

In the rigid configuration, the second end of the second member 112 is configured to move by the same amount as the movable road component 106. In other words, in the rigid configuration the energy harvesting apparatus 100 is configured to transfer energy from the vehicle moving over the road to be used as a work input elsewhere. In this case, the link 108 may be configured to be in a fixed relationship relative to the movable road component 106.

In one example, one or more of the first member 110, second member 112 and the third member 120 is adjustable in length. For example, one or more of the first member 110, second member 112 and the third member 120 is telescopic. In other examples the first member 110, second member 112 and the third member 120 are formed of rigid components, such a bars, tubes or the like.

Referring back to the example shown in FIG. 2, the energy harvesting apparatus 100 may include one or more sensors 134A, 134B. In one example, the one or more sensors 134A, 134B comprises a weight sensor configured to measure the weight of a vehicle passing through a vehicle's axle. In other examples the one or more sensors comprises a speed sensor configured to measure the speed of a vehicle. In one embodiment, the one or more sensors 134A, 134B comprises a weight sensor and a speed sensor.

The speed sensor is shown as part of the road 104 in FIG. 2, but in practice, it may take the form of a speed camera, or the like.

The sensor data from the one or more sensors 134A, 134B may be used as an input for determining whether the link 108 should be in the rigid configuration or the flexible configuration. For example, the apparatus 100 may comprise a controller 136 that is configured to receive data from the one or more sensors 134A, 134B and operate the actuator 132 to adjust the link 108 to the correct orientation (e.g., rigid or flexible as required). In one example, the sensor data from the one or more sensors 134A, 134B may be used as an input for determining how many links 108 of the energy harvesting apparatus 100 are configured to be made rigid.

Figure 4A:
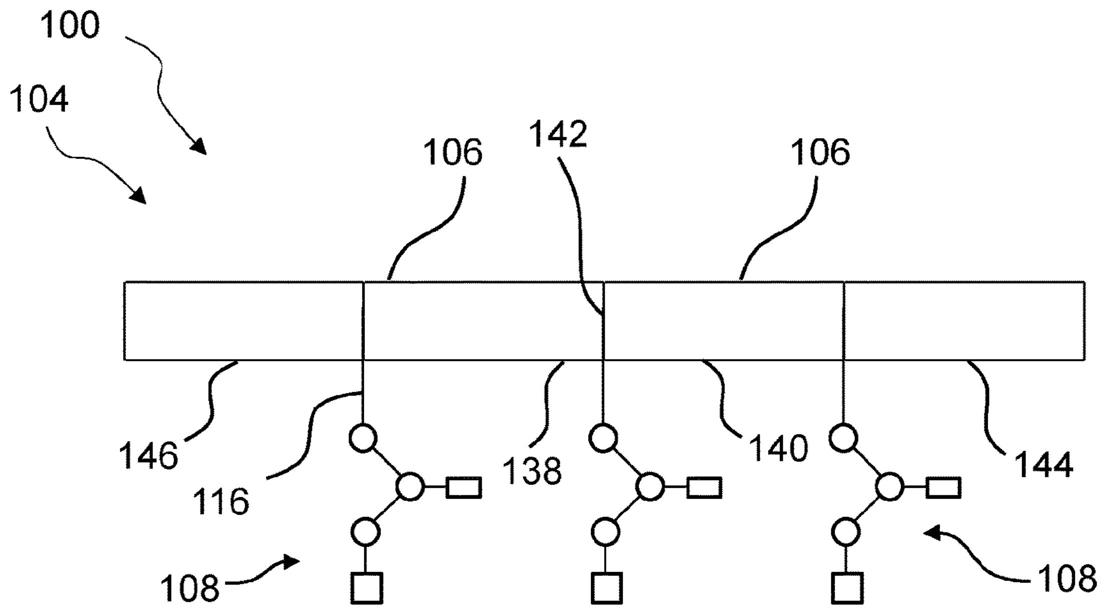
FIG. 4A shows a schematic example of a cross section through the apparatus in an unloaded state.

FIG. 4A shows an alternative example of the energy harvesting apparatus 100. In this example, the road 104 comprises a plurality of movable sections. For example, the road 104 comprises a first road section 138 and a second road section 140. In this example, one or more of the first road section 138 and the second road section 140 is the movable road component 106.

The first road section 138 and a second road section 140 are adjacent to one another along a common boundary 142. In one example, a trailing region of the first road section 138 arranged adjacent to a leading region of the second road section 140.

The trailing region of the first road section 138 may comprise a series of slots or teeth configured to castellate and align with a corresponding plurality of slots or teeth of the leading edge of the second road section 140 along the common boundary 142. In one example, there is a clearance between the series of slots or teeth of the first road section 138 and the slots or teeth of the second road section 140.

In the example shown in FIG. 4A, a third road section 144 and a fourth road section 146 is also shown, but in some embodiments only a first road section 138 and second road section 140 are included. In some embodiments, more than four road sections are included in the apparatus 100.

In this example, at least the first road section 138 and the second road section 140 are movable due to the weight of said one or more vehicles 102 being supported on the road sections or an adjacent road section.

As shown in FIG. 4A, the apparatus 100 includes one or more links 108, which operate as described above in FIGS. 3A and 3B. A link 108 may be placed directly under a movable road section (e.g., the first movable road section 138 or the second movable road section 140). In other examples, the link 108 may be placed at a junction or boundary between adjacent road sections. For example, the link 108 may be placed between the first road section 138 and the second road section 140. In some examples, a leg 116 (which may be part of the road 104 or the link 108) may extend down from the road 106 to couple with the first member 110 of the link 108 as described above. In other examples, the first member 110 of the link is configured to directly abut or connect with the road 106.

Figure 4B:
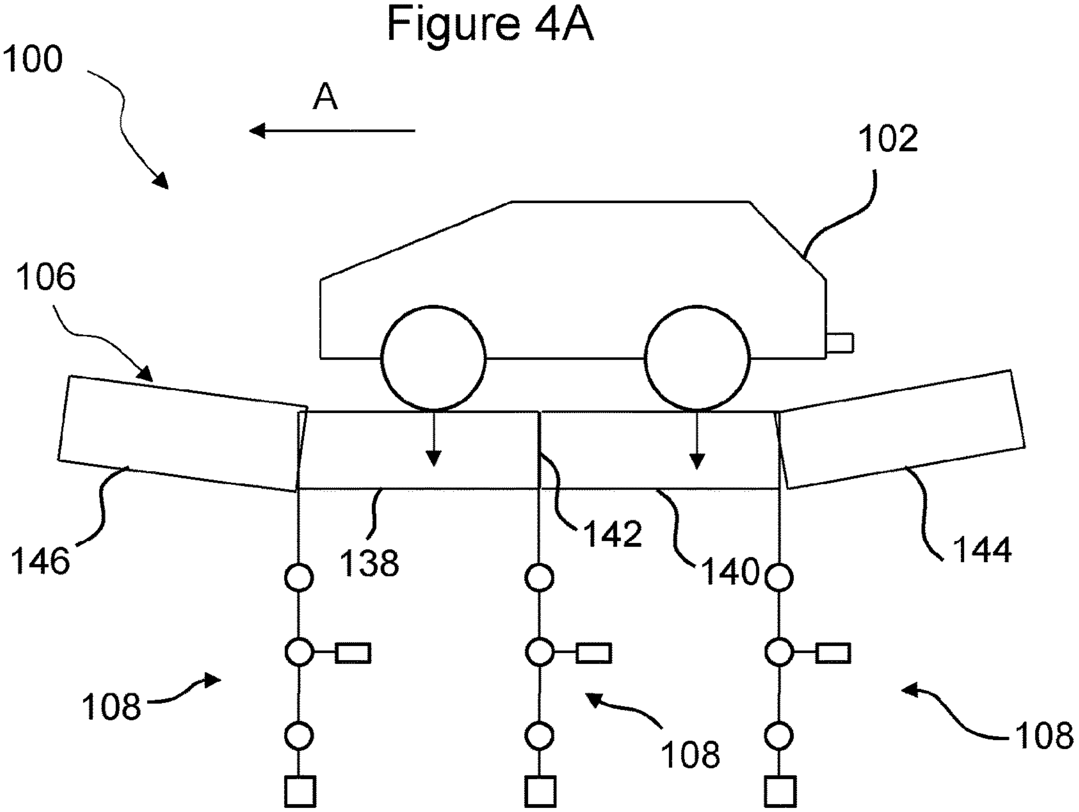
FIG. 4B shows a schematic example of a cross section through the apparatus in a loaded state.

FIG. 4B shows an example of the road 104 in a loaded state. That is to say that a vehicle 102 is supported on one or more of the first road section 138 and the second road section. In this example, the first road section 138 and the second road section 140 will move due to the weight of the vehicle 102 and the movement may be transferred to the link 108 in the same was as set out above in relation to FIGS. 3A and 3B.

As will be explained in more detail below, adjacent road sections will be coupled together and so the position of a trailing edge of one road section and a leading edge of an adjacent road section (i.e., the abutting edges of adjacent road sections) will move together. In other words, the abutting edges of adjacent sections of roads will move by the same amount.

In FIG. 4B, the links 108 are shown in a rigid configuration. In some examples, each road section comprises more than one link 108, which may be selectively placed in a rigid/flexible configuration as will be described in more detail below.

Figure 5A:
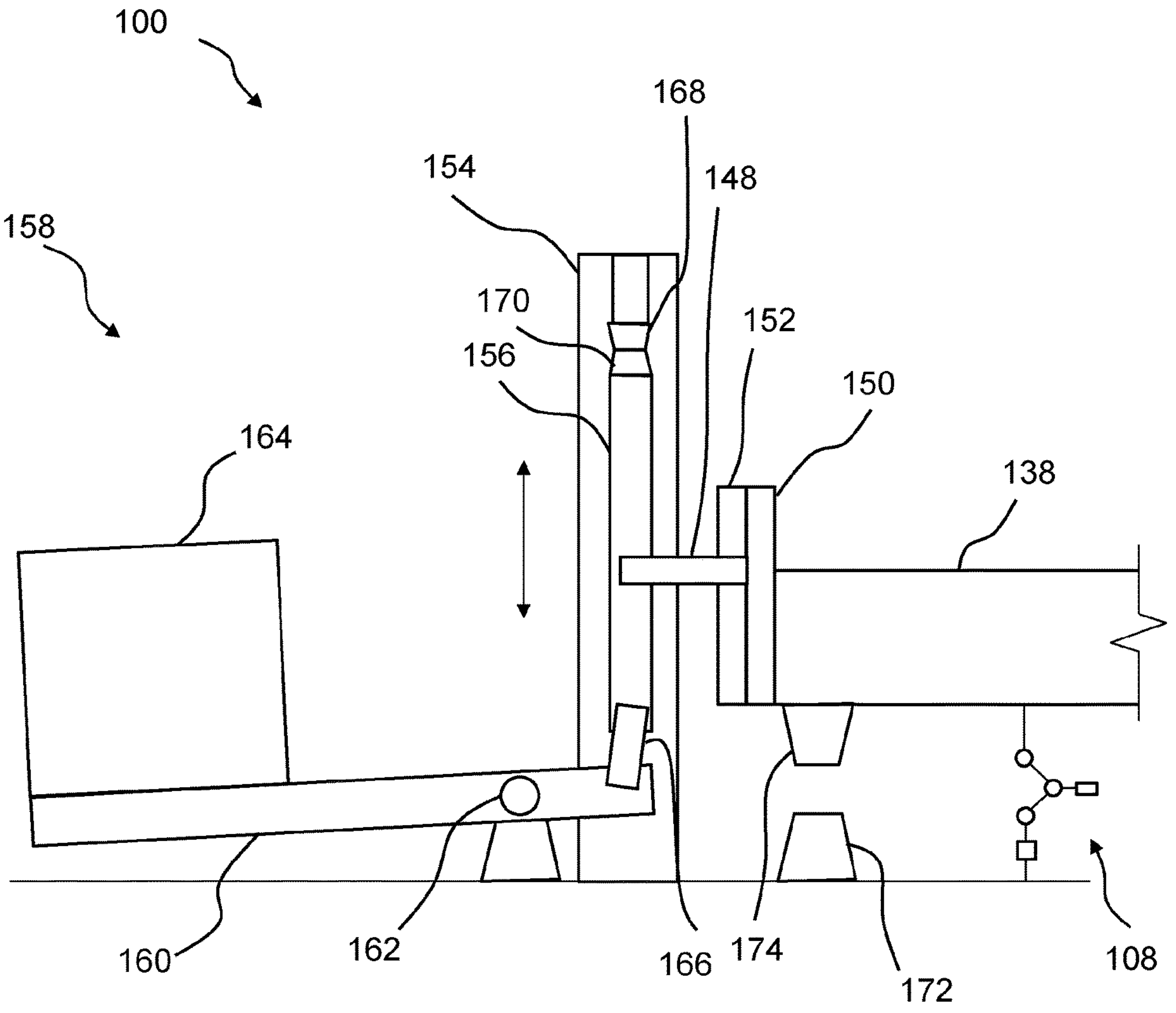
FIG. 5A shows a schematic a cross section of an example of the apparatus in an unloaded state.

A more detailed cross-section of part of the apparatus 100 is shown in FIG. 5A. In the example of FIG. 5A, the cross-section is taken at the boundary 142 (shown in FIGS. 4A and 4B between the first road section 138 and the second road section 140. In this example, the road section is shown as being the first road section 138, but in practice, it could be another road section. The apparatus 100 may include a pivot 148. In the example shown in FIG. 5A, the pivot 148 comprises a rod or spindle, but other means for providing a pivot are envisaged. The first road section 138 and the second road section 140 may be coupled to the pivot 148 such that they may rotate about the pivot 148 relative to each other in use. In one example, a leading plate 150 is fixed to the second road section 140 and a trailing plate 152 is fixed to the first road section 138.

The plates may be positioned such that the leading plate 150 and the trailing plate 152 at least partially overlap in use. That is to say that the leading plate 150 may abut the second road section 140 and the trailing plate 152 may be spaced apart from the first road section 138 such that the trailing plate 152 and the leading plate 150 may abut each other, in use.

The leading plate 150 and the trailing plate 152 may both comprise apertures that are configured to be aligned in use and the pivot 148 is configured to pass through both the aperture of the leading plate 150 and the aperture of the trailing plate 152.

In one example, the aperture in the leading plate 150 is a slotted aperture and the aperture in the trailing plate 152 is a slotted aperture.

FIG. 5A also shows a guide rail 154 that is configured to receive and support the pivot 148. In one example, the pivot 148 is configured to be attached to a sliding mechanism, such as a sliding plate 156 that is configured to slide in a first direction within the guide rail 154 upon the application of force in the first direction. The first direction is represented by the arrows shown in FIG. 5A. The guiderails 154 may include one or more slots (or rails/guides) that are complimentary shaped to the sliding plate 156 so as to allow the sliding plate 156 to move in the first direction upon the application of a force. In one example, the sliding plate 156 includes an aperture in which the pivot 148 is received. In other examples, the pivot 148 is attached to a surface of the sliding plate 156.

In one example, the apparatus 100 includes a biasing element/bias 158 configured to bias the pivot 148 to a raised position (as shown in FIG. 5A). In one example, this is done by biasing the sliding plate 156 to which the pivot 148 is coupled to a raised position. The bias element 158 may be in the form of a pivoting beam 160 that is configured to pivot about a fulcrum 162. The pivoting beam 160 is configured to be coupled with the sliding plate 156 on a first side of the fulcrum 162 and a counterweight 164 is positioned on a second side of the fulcrum 162. That is to say that the counterweight 164 acts to bias the pivot 148 to a raised position in an unloaded state in the absence of external forces. The pivoting beam 160 may be coupled to the sliding plate via an intermediate connection 166.

In another example, the biasing element 158 may take the form of one or more springs configured to exert a force on the sliding plate 156 to position the sliding plate 156 to a raised position in the absence of other force.

The pivot 148 may be positioned relative to the one or more road sections 138, 140 such that it is aligned with a top surface of the coupled, adjacent one or more road sections 138, 140. The first road section 138 is rotatable relative to the second road section about the pivot 148 and so aligning the pivot 148 with the adjacent top surface of the first section 138 and the second road section 140 means that the top surface of the road 136 may be substantially continuous, i.e., with no step changes that may cause problems for cars driving thereon.

The apparatus 100 may include a plurality of buffers 168, 170, 172, 174 configured to limit the extent of movement of the road 104 from an unloaded state to a loaded state. A first set of buffers 168, 170 may form part of the guide rail 154 and a second set of buffers may form part of the road section. In FIG. 5A, the road 104 is arranged in a raised position. That is to say that the pivot 148 is biased to a raised position. In this raised position, the first set of buffers 168, 170 may be configured to abut one another such that the pivot is prevented from being raised further. In the unloaded state, the second set of buffers 172, 174 is configured to be spaced apart from one another.

In FIG. 5A, the self-weight of the deformable road 104 is transferred through the pivot 148 to the biasing element 158, which has sufficient strength (bias) to maintain the pivot 148 in a raised position.

In FIG. 5A, the link 108 is shown as being coupled with an underside of the first road section 148 and in the flexible configuration.

Figure 5B:
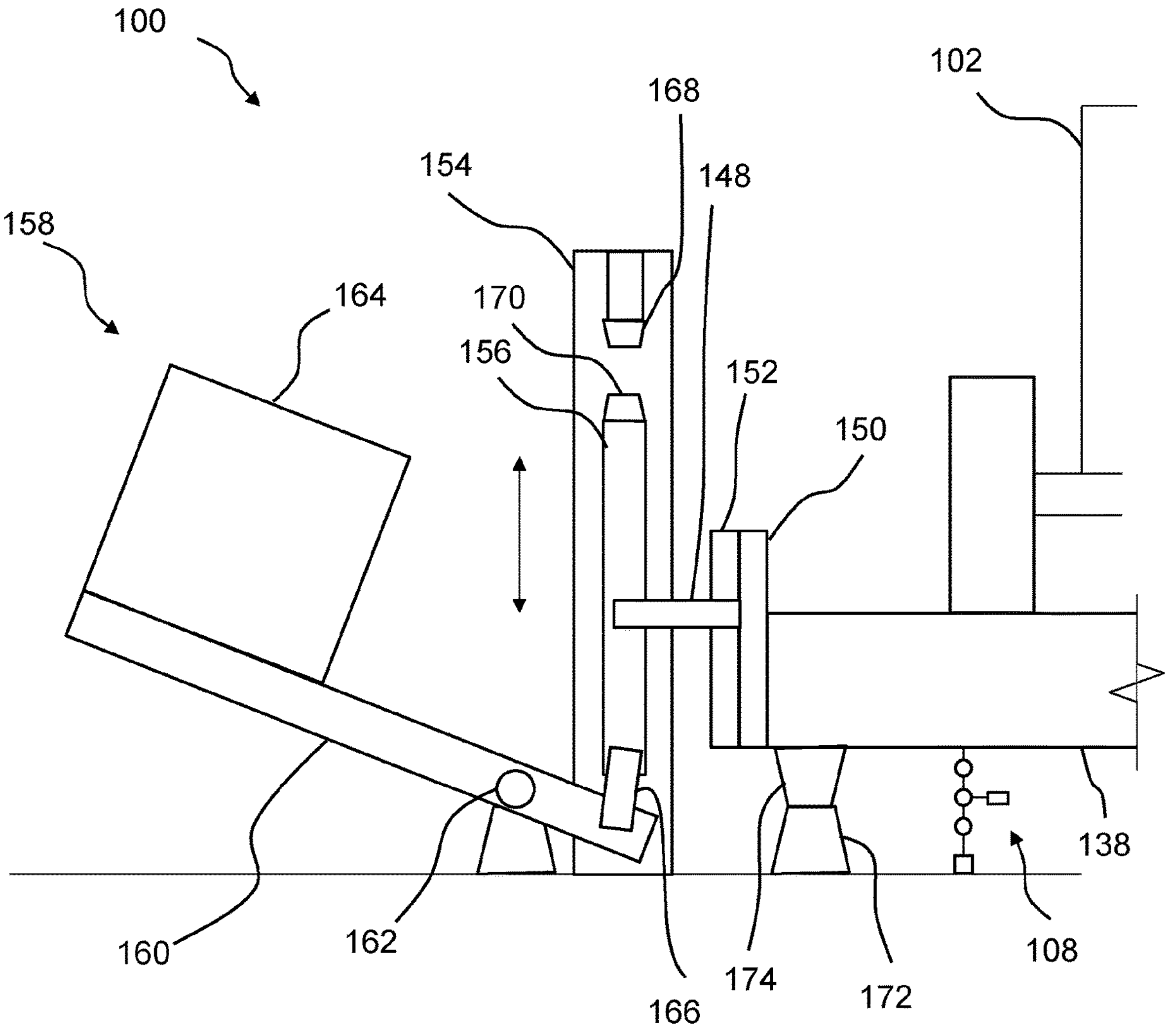
FIG. 5B shows a schematic a cross section of an example of the apparatus in a loaded state.

FIG. 5B shows the apparatus 100 in a loaded state. That is to say that as a vehicle 102 is passing over the first road section 138 and/or the second road section 140 and the weight from the vehicle 102 is being transferred through the first road section 138 and/or the second road section 140 to the pivot 118. The weight of the vehicle 102, in addition to the self-weight of the first road section 138 and the second road section 140 is sufficient to overcome the bias provided by the biasing element 158 and move the pivot 148 in a first direction. In some examples, the first direction is substantially vertical.

In other words, the pivot 148 is configured to move away from the raised position as the vehicle 102 passes over the first road section 138 and/or the second road section 140. The movement of the pivot 148 is dependent upon the weight of the vehicle 102 that is transferred to the pivot 148 via one or more of the first road section 138 and the second road section 140 overcoming the biasing force provided by the biasing element 158.

In the example shown in FIG. 5B, the link 108 has been moved to a rigid configuration. In this rigid configuration, the movement of the road is transferrable to the link 108 to be usable as a work input in an additional apparatus.

In one example, the unloaded position of the pivot 148 may be adjusted by adjusting the amount of biasing force provided by the biasing element 158. In the example shown in FIGS. 5A and 5B, this could be achieved by adjusting the position of the counterweight 164 relative to the fulcrum 162. In other words, the lever arm of the counterweight 164 can be adjusted to change the moment created by the counterweight about the fulcrum 162. The position of the counterweight may be adjusted by an actuator (not shown) configured to move the counterweight on the pivoting beam 160. In other examples, the position of the fulcrum itself is adjusted by an actuator. That is to say that the pivoting beam 160 may translate in a horizontal direction so as to change the lever arm of the biasing element 158. The bias and weight combine to provide a desired amount of movement due to the weight of the vehicle.

In the example in which the one or more sensors 134A, 134B comprises a speed sensor, the position of the pivot 148 between the first road section 108 and the second road section 140 may be moved to selected position at the appropriate time that the vehicle 102 is passing over the first road section 138 and the second road section 140. The position of the pivot 146 may be adjusted by moving the position of the counterweight 164 relative to the fulcrum 162 in based on the data from the one or more sensors 134A, 134B as described above.

The movement of the movable road component 106 may be used as a work input. In one example, the apparatus 100 includes an energy driving mechanism 180 configured to receive the work input from the link 108 in the rigid configuration. In other words, the movement of the movable road component 106 causes the link 108 (in the rigid configuration) to provide a work input to an energy driving mechanism 180. When the link 108 is in the flexible configuration, the movement of the movable road component 106 will be substantially isolated from the energy driving mechanism 180.

In other examples, the apparatus 100 does not include the energy driving mechanism 180, but is rather configured to transfer energy to the energy driving mechanism 180.

Figure 6A:
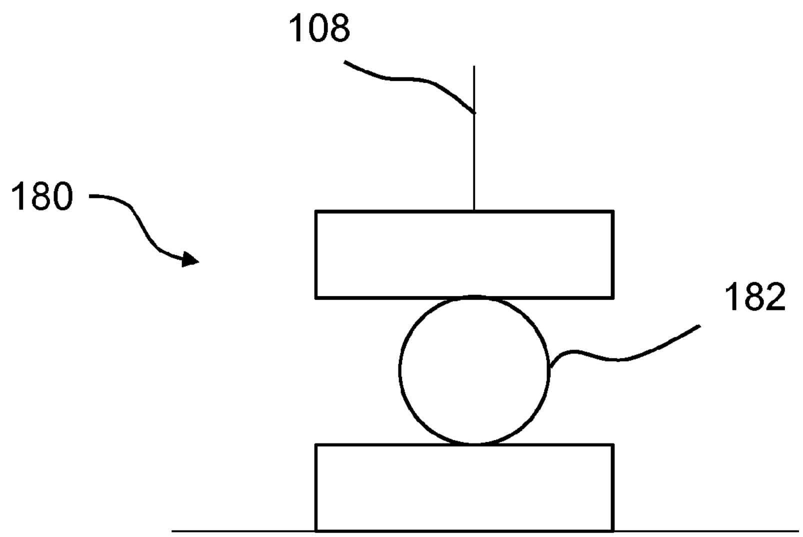
FIG. 6A shows an example of a pump in an uncompressed state.
Figure 6B:
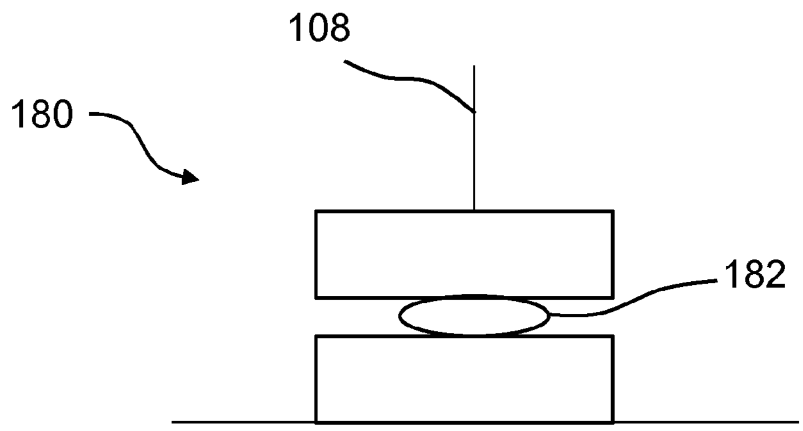
FIG. 6B shows an example of a pump in a compressed state.

In one example, as shown in FIGS. 6A and 6B, the energy driving mechanism 180 comprises a pipe 182 for transporting fluid. The pipe 182 may be located underneath the link 108 and configured to transport fluid due to the movement of the movable road component 106 (and hence the link 108) as a vehicle 102 passes over the road 104.

In FIG. 6A, the pipe is shown in a substantially uncompressed state, that is to say that the link 108 is not imparting a significant force on the pipe and the pipe is in an open configuration.

In FIG. 6B, the pipe 182 has been deformed or squashed due to the movement of the movable road component 106. The movable road component 106 has moved due to the weight of the vehicle 102 and the link 108 is in the rigid configuration to transfer the load from the vehicle 102 to the pipe 182.

As shown in FIGS. 6A and 6B, the pipe 146 may be located on a plinth 152 or raised support. The compression of the pipe will result in fluid being forced along the pipe 182. In some examples, the pipe 182 comprises one or more valves to force fluid through the pipe in a single direction.

After the vehicle 102 has moved away from the movable road component 106, the movable road component 106 will return to the original position and the pipe 182 will no longer be squashed.

The fluid may take the form of water-soluble oil, hydraulic oil, or other suitable fluids.

In some examples, the energy driving mechanism 180 is a pump or a generator that is configured to use the motion from the movable road component 106 as a work input. In one example, the link 108 is configured to drive a single acting cylinder pump or a double acting cylinder pump.

In one example, the energy driving mechanism 180 comprises bellows type cylinders beneath the road to drive a fluid.

In one example, the energy driving mechanism 180 comprises a mechanical rack and pinion. In other examples, the energy driving mechanism comprises a mechanical piston (e.g., a train wheel gear).

In one example, the energy driving mechanism 180 comprises one or more of a peristaltic pump, compressor, piston mechanism, gear mechanism, pneumatic equipment, hydraulic equipment and/or electric equipment.

The link 108 may be usable with various different types of energy driving mechanisms 180 as described above. These different energy driving mechanisms may have different capacities.

In some examples, the movement of the movable road component 104 is used to drive fluid from a first reservoir to a second reservoir that has a higher head compared with the first reservoir. That is to say that the apparatus may be used to transport fluid to a position with higher potential energy that may be used for energy generation at a later time.

In one example, the apparatus comprises a structure configured to extend over the road, the structure configured to hold fluid within it and the energy driving mechanism is configured to move fluid within the structure, in use.

In other examples, the apparatus 100 may be used to provide work input to charge a battery or provide energy for the grid. In other examples, the work input may be used as an actuator to drive movement of additional components.

The energy harvesting apparatus 100 described above can be used in many different scenarios. For example:

Creating a generator road;

Roundabouts;

Near existing water reservoir;

Near city centres used as traffic calming measures;

Near give way or stop signs to aid slowing cars down;

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An energy harvesting apparatus comprising:

a movable road component that is configured to move away from a raised position due to a weight of one or more vehicles on the movable road component;

a link that is coupled to the movable road component, the link being movable between a rigid configuration and a flexible configuration, wherein in the rigid configuration, the link is configured to transfer force from the movable road component to act as a work input; and wherein in the flexible configuration, the link is configured to substantially isolate the movement of the movable road component to prevent the link from acting as a work input, wherein the movable road component comprises a first road section and a second road section forming a surface of a road on which a vehicle is drivable, wherein the first road section is movable with respect to the second road section, wherein the movable road component comprises:

a pivot, wherein a trailing region of the first road section is coupled with a leading region of the second road section at the pivot, such that the first road section and the second road section are partially rotatable relative to each other about the pivot; and one or more guiderails configured to receive said pivot and constrain movement of the pivot to a first direction as a vehicle is passing over the road surface, wherein the pivot is configured to move away from the raised position when said weight of said vehicle is supported on one or more of the first road section and the second road section.

2. The energy harvesting apparatus of claim 1, wherein in the rigid configuration, the link is configured to move in a first direction such that it is in a fixed relationship relative to the movable road component.

3. The energy harvesting apparatus of claim 1, wherein the link comprises a first member and a second member coupled together at a first fixation point, wherein in the rigid configuration, the first member and a second member are fixed relative to each other at the fixation point and wherein in the flexible configuration the first member and second member are movable relative to each other about the fixation point.

4. The energy harvesting apparatus of claim 3, wherein the link comprises an actuator coupled to the fixation point to selectively change the link between the rigid configuration and the flexible configuration.

5. The energy harvesting apparatus of claim 4, comprising:

a speed sensor configured to measure the speed of said vehicle; and a controller configured to control the actuator to selectively change the link from the flexible configuration to the rigid configuration in advance of the vehicle passing over the movable road component.

6. The energy harvesting apparatus according to claim 1, wherein the movable road component comprises a head section configured to protrude above a substantially level surface of a road and a leg section that is configured to extend through the surface of road to couple with the link.

7. The energy harvesting apparatus according to claim 6, wherein the leg section is configured to be constrained to move in a first direction by one or more leg guides.

8. The energy harvesting apparatus according to claim 1, wherein a trailing edge of the first road section comprises a plurality of slots and teeth configured to mesh with a correspondingly shaped plurality of slots and teeth of a leading edge of the second road section.

9. The energy harvesting apparatus according to claim 1, comprising a first sliding plate comprising an aperture through which the pivot is configured to extend;

wherein the first sliding plate is configured to be received in the one or more guiderails to constrain the movement of the first sliding plate and pivot to the first direction along the one or more guiderails.

10. The energy harvesting apparatus according to claim 1, comprising a biasing element configured to bias the movable road component to the raised position.

11. The energy harvesting apparatus according to claim 10, wherein the biasing element comprises a counterweight.

12. The energy harvesting apparatus according to claim 1, comprising a weight sensor configured to sense the weight of said vehicle passing on the energy harvesting apparatus, wherein an amount of biasing provided by the biasing element is adjusted dependent on the weight of said vehicle.

13. The energy harvesting apparatus according to claim 1, wherein the apparatus includes an energy driving mechanism and the link is configured to be coupled to the energy driving mechanism and provide the work input to the energy driving mechanism.

14. The energy harvesting apparatus according to claim 13, wherein the energy driving mechanism comprises one or more of:

a rack and pinion;

a piston gear;

one or more direct drive gears; and/or any mechanical drive, for example a piston drive.

15. The energy harvesting apparatus according to claim 14, wherein the energy driving mechanism is configured to transport fluid from a first position to a second position having a higher head.

16. The energy harvesting apparatus according to claim 15, wherein the fluid comprises one or more of water, soluble oil, hydraulic oil, seawater, de-salination plant or other suitable fluids.

17. The energy harvesting apparatus according to claim 14, wherein the energy driving mechanism is configured to generate electric energy.

18. The energy harvesting apparatus according to claim 13, wherein the energy driving mechanism comprises one or more of:

a single acting pump;

a double acting pump;

a peristaltic pump;

a bellow pump;

a peristaltic pipe for transporting fluid; and/or an air/gas fluid compressor and/or pump.

19. The energy harvesting apparatus according to claim 13, comprising a structure configured to extend over the road, the structure configured to hold fluid within it and the energy driving mechanism is configured to move the fluid within the structure, in use.

* * * * *